Aug. 11, 1942.    H. R. STUART    2,292,491
FULLY AUTOMATIC SIGNAL CONTROLLER
Filed Oct. 18, 1940
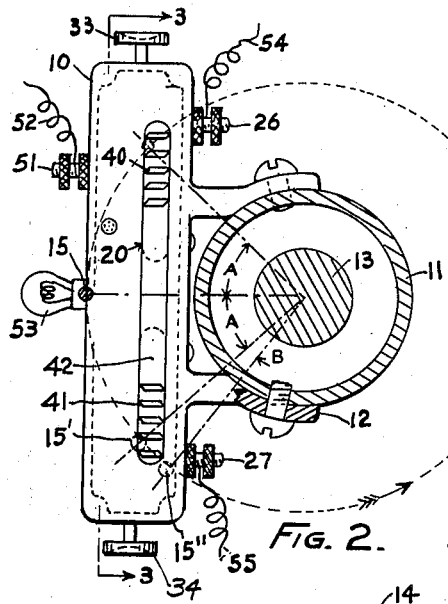
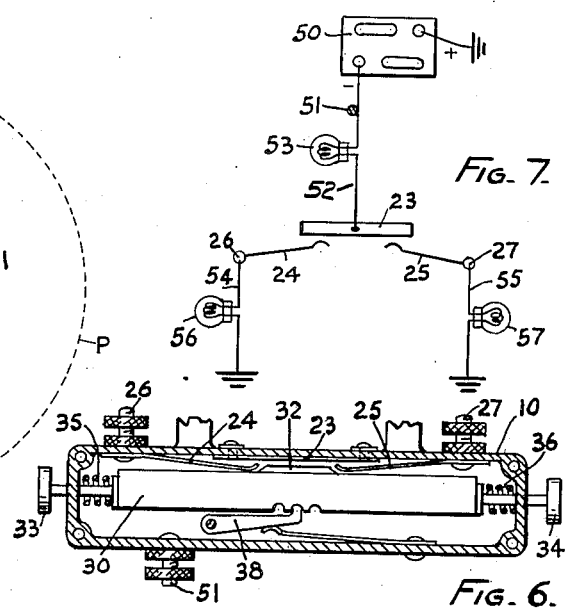
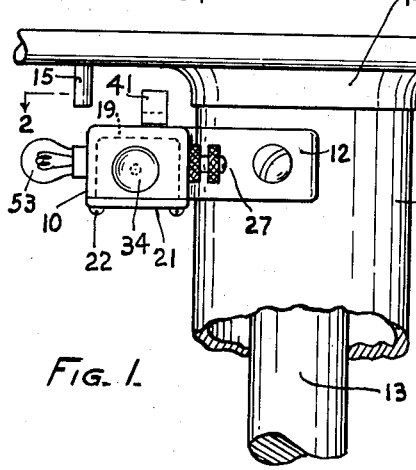
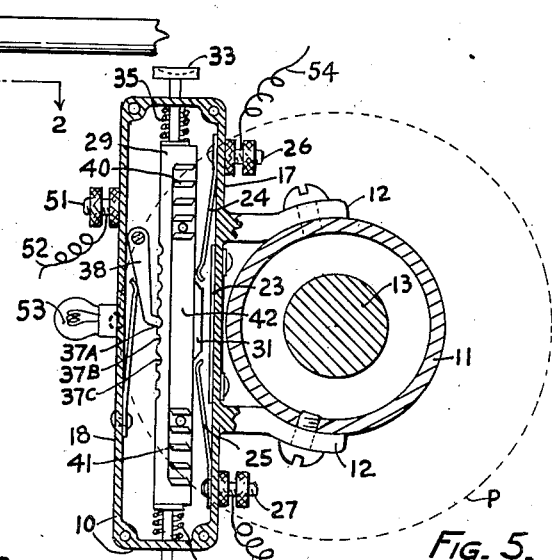
INVENTOR.
HARVE R. STUART.
BY Louis Illmer
ATTORNEY.

Patented Aug. 11, 1942

2,292,491

UNITED STATES PATENT OFFICE 2,292,491

FULLY AUTOMATIC SIGNAL CONTROLLER

Harve R. Stuart, Springfield, Ohio, assignor of one-half to Louis Illmer, Cortland, N. Y.

Application October 18, 1940, Serial No. 361,751

8 Claims. (Cl. 200—59)

This invention pertains to improved remote control means for automotive signals, and more particularly has to do with a novel system for switching electrical direction indicating means for vehicles from the driver's seat. Basically the underlying principle is complementary to that disclosed in my copending application, Serial No. 262,599 filed March 18, 1939 but in certain respects refines the actuated switch mechanism thereof.

The object of the present improvements is to devise an inherently simple and reliable controller of the fully automatic type for either new or old equipment purposes in which all principal components may be economically fabricated and compactly assembled for installation on a steering wheel column or the like vehicle member within convenient manipulative reach of the driver.

Embodied herein are also other novel structural features that will hereinafter be more explicitly set forth. Reference is had to the accompanying one sheet of drawings that illustrate a specific embodiment of my invention, and in which drawing:

Fig. 1 shows an exterior elevational view of my switch assembly affixed to a steering wheel column.

Fig. 2 represents a transverse top view taken along 2—2 of Fig. 1 with the switch mechanism set in a neutral position.

Fig. 3 is a vertical sectional view taken along 3—3 of Fig. 2, and Fig. 4 a similar view taken along 4—4 of Fig. 3.

Fig. 5 depicts my assembly as seen along the horizontal section line 5—5 of Fig. 4, and Fig. 6 represents a corresponding view along 6—6 of Fig. 4.

Fig. 7 schematically represents a signal wiring diagram.

Referring in detail to these disclosures, my controller devices may be operatively assembled about the chambered switch housing 10 preferably moulded from plastic insulating material and bracketed alongside the stationary tubular column 11 beneath its steering wheel by means of any suitable clamping lugs such as 12. In automotive practice, a hand wheel spindle 13 is usually installed within said column and has a conventional wheel hub 14 attached to the upper spindle end (see Fig. 1). As will presently appear, said steering wheel may be equipped with a pear, said steering wheel may be equipped with a single gear tooth or depending drive pin 15 which is timed to automatically and intermittently actuate my switch mechanism in unison with certain wheel movements.

The Bakelite housing 10 may be given an elongated box-shape to comprise mated fore and aft side walls 17 and 18, also an integral top wall 19 that may be longitudinally slotted at 20. The open bottom of such chambered housing may be enclosed by a cover plate 21 retained in place by corner screws such as 22. My switch agency preferably comprises a stationary metallic strip or so-called contact block 23 that may be riveted interiorly to the fore sidewall 17. Reversely mounted with respect to the block ends, is a pair of resilient contact fingers 24 and 25 that are purposely kept comparatively wide so as to cooperatively straddle certain cams. Said make and break fingers are arranged to normally spring away from the block 23 to leave an air gap therebetween. Each such finger may respectively be provided with independent binding posts 26 or 27 that are wired to the right hand and the left hand signal lamps (see Fig. 7).

For actuating one or the other of said fingers to positively close the respective make and break gaps thereof, I provide for mated metallic bar members of which one such comprises a reciprocative floating bar 29 that may be slidably superimposed upon a similar auxiliary or rectilinear preshift bar 30. Each aligned fore face of such mated bars may respectively be equipped with a separate side cam element 31 and 32 (see Fig. 4). Dependent upon their direction of longitudinal movement, said bar cams are respectively adapted to conjointly actuate either one of the straddling fingers 24 or 25 into operative contact with the block 23 in a manner that will subsequently be defined.

Each end of said preshift bar may be extended through an adjacent transverse housing wall as in Fig. 5 by a guide pin that respectively terminates in a right hand and a left hand push button 33 and 34 disposed for convenient manipulation by the driver. Opposed coil springs 35 and 36 of the balanced type normally center and definitely locate the rectilinear bar 30 in its full-lined dwell or neutral mid position. The aligned aft faces of the bars 29 and 30 may respectively be provided with a registering series of spaced transverse notches such as 37A, 37B, etc. disposed to each side of their bar center line (see Fig. 3). The toe of the bar straddling detent or spring actuated pawl means 38 is intended to successively engage the several bar notches. When manually preshifted, the reciprocative bar 30 is thereby releasably retained against unbalanced thrust of the springs 35 and 36; when tripped, such released bar is automatically returned into its mid position and allows the pawl to engage the medial notch thereof.

Referring in further detail to said floating metal bar 29, this is preferably provided with opposed groups of actuated upstanding teeth collectively designated 40 or 41 and which respective series of teeth may extend inwardly to any desired extent and be integrally interconnected by a supplementary transverse bar 42 that holds the groups in spaced tandem relation lengthwise of the floating bar axis. Opposed tooth edges of the respective groups 40 and 41 may be reversely chamfered in the Fig. 5 manner to clear the drive pin 15 when passed therethrough. Said supplementary bar may be arranged to slide freely along the top face of the housing wall 19. To this end, the bar 42 may be upheld by a pair of spacer props such as 43 which extend through a housing slot 20 and may be carried by the floating bar 29 to permit its teeth to travel in unison into either extreme of longitudinal travel position 40' or 41' as indicated in dotted outline (see Fig. 3).

Fig. 2 reveals a preferred mode of cooperation between one group of such teeth and the single timing pin 15. Said depending wheel pin travels around the circular path P in a concentric relation to the spindle axis. The steering wheel may be given a prescribed acute leeway angle in opposed directions designated A without striking either group of bar teeth. However, should such idle movement be exceeded and said pin carried onward in the arrowed counterclockwise direction, the tooth disposition is such that said pin in its critical position 15' will first enter between and through the outermost pair of teeth in the group 41 and thereby rightwardly advance the floating bar 29 to a limited extent. After the travel pin position 15'' is reached the toe of the pawl 38 will engage a next adjacent notch 37B and all teeth will be left standing in a partially shifted position. Whenever the wheel hub 14 is given an additional complete turn in a like direction, the next successive set of teeth will become pin engaged which in turn further positively advances the floating bar stepwise.

It will be observed that the longitudinal movement of my toothed bar 29 is disposed to travel chordwise with respect to the circular path P. The overall rack length of my pin-actuated teeth is purposely made to substantially fall within such chord length; in a centralized rack travel position, the respective terminal or outer rack end teeth are both brought into straddling interference with said path in the Fig. 2 manner. When the single timing pin 15 is rotated outwardly away from its normal straight ahead wheel station through more than one revolution in a given direction, said pin first strikes and operatively engages one such interfering outer tooth to initiate a stepwise rack shift that withdraws and progressively clears the opposed interfering terminal tooth by carrying the same interiorly of the pin path confines. Such timely inward tooth withdrawal, minimizes the extreme accumulative stepwise travel of the teeth 41' (see Fig. 3) and allows the use of a correspondingly short housing length.

The cited initial movement of the floating bar in one direction causes its cam 31 to throw a corresponding finger into contact with the block 23 whereby to close an appropriate lighting circuit which is dependent upon the direction of rotation given to the wheel in excess of the angular leeway station A. The trippable pawl 38 successively follows up a different aligning notch to intermittently retain the bar 29 until the pin 15 when traversing the path P, brings about a further stepwise bar advance, the upstanding teeth being properly located for actuation by the timing pin in the manner of a wheel turn recording agency. In the meantime the cam 31 holds the make and break switch closed.

When the timing pin continues to pass onward in the arrowed direction beyond its position 15'' in Fig. 2, then the resulting stepwise rightward shift on part of the floating bar will have cleared the outermost retracted tooth of the other group of teeth 40 and thus allow said pin to pass without interference.

After completing a contemplated vehicle turn and starting to reverse the steering wheel, the timing pin will first actuate the last engaged set of upstanding teeth and thereby initiate a bar shift inwardly. Upon again reaching the straight ahead wheel position, said floating bar 29 will finally be returned into its dwell or neutral mid position represented in Fig. 5, wherein the controlled make and break switch parts will be automatically opened. The fact that my control mechanism is disposed about a line of symmetry causes it to function in a corresponding manner for either direction of wheel rotation.

The auxiliary preshift bar 30 permits a proper signal to be given prior to making a contemplated vehicle turn. By pressing an appropriate right hand or left hand button inwardly, this causes the cam 32 to impress a corresponding contact finger against the block 23 and thereby energize the direction signal associated therewith. The notches such as 37B' while pawl engaged, retain the preshifted floating bar against unwanted spring return. When the steering wheel subsequently follows up a contemplated vehicle turn, the floating bar becomes active in thrusting its cam 31 behind an appropriate contact finger whether or not it may have been previously closed by manual shift on part of the auxiliary bar 30. The engagement of the pawl 38 into the first floating bar notch 37B will bring about a tripping of a preset shifting bar 30 and allows of its release into neutral position under the influence of the balanced springs 35 and 36.

The described intermittent pin engagement with my shiftable rack is devised to progressively throw the rack out of its centralized or neutral switch position in moderate stepwise advances for each recorded wheel revolution. As arranged in the Fig. 2 layout, each such successive advance may be kept relatively small with respect to the chord length that spans the angle 2A and thereby substantially hold the corresponding overall housing length within the path dimension P, although allowing for some three or four wheel turns in either direction. It will be obvious that the cited comparatively short overall housing length is significant in meeting present day controller requirements.

It is further pointed out that the independently shiftable bars 29 and 30 essentially constitute a compound switch actuating agency that combinedly cooperate with the contact fingers 24 and 25. When the shiftable bar 42 is intermittently engaged by the drive pin 15, the resulting signal will accurately respond to the actual turning direction imparted to the steering wheel, when returned into its straight ahead station, said bar will invariably be left standing in its central travel position. As an outstanding feature, the present invention assures a registered signal that shall without fail truly reflect the car turn that is actually being instituted by the driver.

Reference is had to Fig. 7 which schematically shows a suitable wiring hook up for my switch devices. One pole of the battery 50 may be series connected to the wired housing post 51 by the lead 52 through a low resistance pilot lamp 53 mounted upon the housing wall 18 (see Fig. 2). The wiring is thence carried to the contact block 23. Separate branch circuits 54 and 55 respectively lead in a conventional manner from the contact fingers 24 and 25 to the individual left hand and right hand signal lamps 56 and 57 respectively.

An important feature of the present controller lies in the use of simplified timed wheel recorder means to register successive steering wheel turns in one and the same direction after my make and break switch has been closed and which recording means by virtue of the floating bar 29, maintains such closed finger contact until the wheel has been substantially returned into its initial straight ahead station within the angular leeway designated A.

Although a wrong push button 33 or 34 may be inadvertently impressed to give a false contemplated vehicle turn, my controller device will still right itself should the wheel thereupon be turned in an opposed direction. In such event, the unbalance springs 35 and 36 when pawl released, will automatically return the fasely preset bar 30 into its mid dwell position without disturbing the function of the floating bar 29. Furthermore, my controller is otherwise designed for fully automatic action; for instance, if the driver should fail to manually energize a desired direction signal by depressing an appropriate push button, the character of the described mechanism is such as to throw the make and break switch into proper contact conforming with the vehicle turn actually made. Upon turn completion, the switch elements automatically break a given signal circuit and all controller parts are left standing in their dwell or neutral mid position for making the following next vehicle turn.

It is thought the foregoing disclosure will make evident to those skilled in this art, the more outstanding advantages afforded by my improved controller assembly over the prior art, also that various changes in the illustrative structural details thereof may be resorted to, all without departing from the spirit and scope of the hereinbefore described invention as more particularly characterized in the appended claims.

I claim:

1. In an electrical direction indicating signal for an automotive vehicle including a steering wheel having a straight ahead station and a leeway angle to each side thereof, guided single drive means operable in unison with the steering wheel to repeatedly traverse a closed circular path when said wheel is rotated in either direction from said station through more than one revolution, controller means provided with a releasable reciprocable rack and with cooperating double-throw switch means having a neutral position adapted to be intermittently shifted into an active switch position by said rack and the teeth of which rack are disposed chordwise of said path within an overall rack length approximately equal to the chord of said path whereby in a released medial rack travel position to bring both of the respective outer rack end teeth into intersecting interference with the aforesaid path, said drive means when rotated outwardly away from the aforesaid wheel station initially engaging one such interfering end tooth and upon continued rotation in the same direction unobstructedly engaging in sequence the teeth lying inwardly adjacent to such one end tooth.

2. In an electrical direction indicating signal for an automotive vehicle including a steering wheel having a straight ahead station, guided drive means operable in unison with the steering wheel to repeatedly traverse a closed circular path when said wheel is rotated in either direction from said station through more than one revolution, slotted controller housing means provided with a floating bar slidably mounted within said housing and with cooperative double-throw switch means having a centralized neutral position adapted to be shifted into an active switch position by said bar, an actuated reciprocative rack disposed exteriorly of the housing confines, and interposed prop means extending through the housing slot to fixedly interconnect the bar with said rack for unitary movement, the rack teeth being disposed chordwise of said path within an overall rack length approximately equal to the chord of said path and which rack in its centralized travel position brings both of the respective outer rack end teeth into intersecting interference with the aforesaid path, said drive means when rotated outwardly away from the aforesaid wheel station serving to initially engage one such interfering end tooth and upon continued rotation in the same direction to engage in sequence the teeth lying inwardly adjacent to such one end tooth.

3. In an electrical direction indicating signal for an automotive vehicle including a steering wheel, guided drive pin means operable in unison with the steering wheel to traverse an endless path, a compound controller switch comprising actuated double throw make and break contact elements having an interposed neutral position and further comprising a longitudinally manipulative preshift bar and a reciprocative bar floatingly arranged lengthwise of the preshift bar in an intersecting chordwise relation to the aforesaid path, said bars being respectively equipped with interconnecting pawl means and with separate cam means serving to selectively close either contact element and which floating bar carries a plurality of intermittently actuated rack teeth that in neutral switch position are substantially confined within the path chord length to bring either outer rack end tooth into interference with the pin means, the last named means irrespective of the position given the preshift bar being arranged to initially engage one such interfering end tooth to automatically close a switch element and simultaneously withdraw the other outer end tooth inwardly into a cleared position lying wholly within said path.

4. In an electrical direction indicating signal for an automotive vehicle including a steering wheel having a straight ahead station, guided drive pin means operable in unison with the steering wheel to traverse an endless path, electrical controller means comprising a housing located beneath the steering wheel, a preshift bar reciprocatively mounted in said housing, manipulative push buttons extending outwardly from the respective bar ends, balanced springs respectively interposed between said bar ends and the housing to return the preshift bar into a medial position, actuated pawl means retaining the bar when set into one of its preshift positions against spring tension, a double-throw make and break switch element arranged to normally dwell in its neutral position and which bar when preshifted out of its medial position actuates said switch into one of its closed positions, a floating bar cooperatively mounted alongside said preshift bar and disposed in an intersecting chordwise relation to the aforesaid path, said floating bar being equipped with means for independently shifting said switch and with a plurality of intermittently actuated rack teeth that in neutral switch position are substantially confined within the length of said path chord to selectively bring either outer rack end tooth into interference with the pin means when rotated through more than one revolution, and actuated means for automatically tripping the set pawl to release the preshift bar whenever the pin means reaches one such interference position.

5. In an electrical direction indicating signal for an automotive vehicle including a steering wheel having a straight ahead station, guided drive means operable in unison with the steering wheel to repeatedly traverse a closed circular path when said wheel is rotated in either direction from said station through more than one revolution, elongated controller housing means whose overall length is kept substantially equal to the diameter of such path and which housing is provided with a reciprocative rack and with cooperative double-throw switch means having a neutral position adapted to be shifted into an active switch position by said rack, the rack teeth being disposed chordwise of said path within an overall rack length approximately equal to the chord of said path whereby in a medial rack travel position to bring both of the outer rack end teeth into intersecting interference with the aforesaid path and allow said drive means while rotated through several revolutions in a common direction to initially engage one such interfering end tooth and shift the switch out of its neutral into a corresponding active position in which the opposed interfering rack end tooth is withdrawn inwardly of said path confines.

6. Electrical controller means comprising a hollow housing having an insulated contact block affixed therein, a pair of double-throw make and break fingers cooperatively disposed in tandem with respect to said block, an intermittently actuated floating bar that is reciprocatively mounted alongside said fingers and has a finger actuating cam arranged to initially dwell in neutral switch position located centrally of the bar travel, said bar being provided with actuated rack teeth disposed chordwise to intersect a hereinafter defined closed path, and single drive means operatively guided about an axis to repeatedly traverse a closed path when rotated through more than one revolution in a given direction and pass the drive means in sequence through successive next adjacent pairs of rack teeth whereby to stepwise advance said cam out of its dwell position into an active closed switch position, each such stepwise cam advance during any one revolution of the drive means being held to less than the minor part of the intersecting chord length and which drive means upon being counter-rotated serves to restore said cam into registry with its initial dwell position.

7. In a fully automatic direction indicating signal, electrical controller means including an actuated make and break switch together with a manipulative spring-returned preshift bar and a floating bar, corresponding longitudinal edges of the respective bars being slidably superimposed and each provided with a plurality of transverse notches arranged to fall into substantial endwise registry when said bars are relatively shifted longitudinally, and a trippable detent straddling both of the aforesaid bar edges and of which detent its toe is arranged to fall into engagement with a preshift bar notch to retain the last named bar when set against its return spring, said toe engagement being tripped by a subsequent longitudinal shift on part of the floating bar.

8. In an electrical direction indicating signal, double-throw make and break switch means including a manipulative preshift bar and a slidably superimposed floating bar, corresponding edges of the respective bars being each provided with an independent cam that respectively dwell in substantial profile registry in open neutral switch position, one contact element of said switch means being disposed to straddle both such cams whereby the switch circuit will become closed by a longitudinal shift on part of either bar with respect to its mated bar.

HARVE R. STUART.